US007599776B2

(12) United States Patent
Sonderegger et al.

(10) Patent No.: US 7,599,776 B2
(45) Date of Patent: Oct. 6, 2009

(54) LOADING UNIT AND/OR A LIFTING UNIT, IN PARTICULAR A REACH STACKER

(75) Inventors: Marco Sonderegger, Feldkirch-Gisingen (AT); Klaus Schneider, Hergatz (DE)

(73) Assignee: Liebherr-Werk Nenzing GmbH, Nenzing (AT)

( * ) Notice: Subject to any disclaimer, the term of this patent is extended or adjusted under 35 U.S.C. 154(b) by 367 days.

(21) Appl. No.: 11/122,979

(22) Filed: May 3, 2005

(65) Prior Publication Data

US 2006/0180381 A1 Aug. 17, 2006

(30) Foreign Application Priority Data

May 4, 2004 (DE) ...................... 10 2004 021 840

(51) Int. Cl.
*B62D 6/00* (2006.01)

(52) U.S. Cl. ........................................ 701/50; 348/118

(58) Field of Classification Search .................. 701/41, 701/23, 42, 25, 26, 28, 50, 202, 205, 210; 348/118–120; 414/3, 4, 6, 22.51, 222.02, 414/222.01, 222.04

See application file for complete search history.

(56) References Cited

U.S. PATENT DOCUMENTS

| | | | | |
|---|---|---|---|---|
| 3,980,999 | A * | 9/1976 | Nishioka et al. | 340/457 |
| 4,268,216 | A * | 5/1981 | Copie | 414/719 |
| 5,579,863 | A * | 12/1996 | Nelson et al. | 180/418 |
| RE36,151 | E * | 3/1999 | Ishino et al. | 701/50 |
| 6,179,082 | B1 * | 1/2001 | Ikari | 180/418 |
| 6,314,348 | B1 * | 11/2001 | Winslow | 701/23 |
| 6,542,789 | B2 * | 4/2003 | Ufheil | 700/275 |
| 6,827,176 | B2 * | 12/2004 | Bean et al. | 180/411 |
| 2003/0216840 | A1 | 11/2003 | Bivas | |
| 2004/0129491 | A1 * | 7/2004 | Bean et al. | 180/411 |

FOREIGN PATENT DOCUMENTS

| | | |
|---|---|---|
| DE | 100 10 011 | 2/2001 |
| EP | 0 343 839 | 11/1989 |
| EP | 0885756 A1 | 12/1998 |
| EP | 0921095 A2 | 6/1999 |
| GB | 2 290 149 | 12/1995 |

* cited by examiner

*Primary Examiner*—Dalena Tran
(74) *Attorney, Agent, or Firm*—Alleman Hall McCoy Russell & Tuttle LLP

(57) ABSTRACT

The present application relates to a loading unit and/or lifting unit, in particular a reach stacker, comprising one or more pick-ups for the detection of at least one operating parameter influencing the standing safety of the unit and comprising a calculating unit in communication with the pick-up(s) which has means by means of which a maximum permitted value of an operating parameter of the loading unit and/or lifting unit for the ensuring of the standing safety is determined in dependence on one or more of the detected operating parameters.

23 Claims, 1 Drawing Sheet

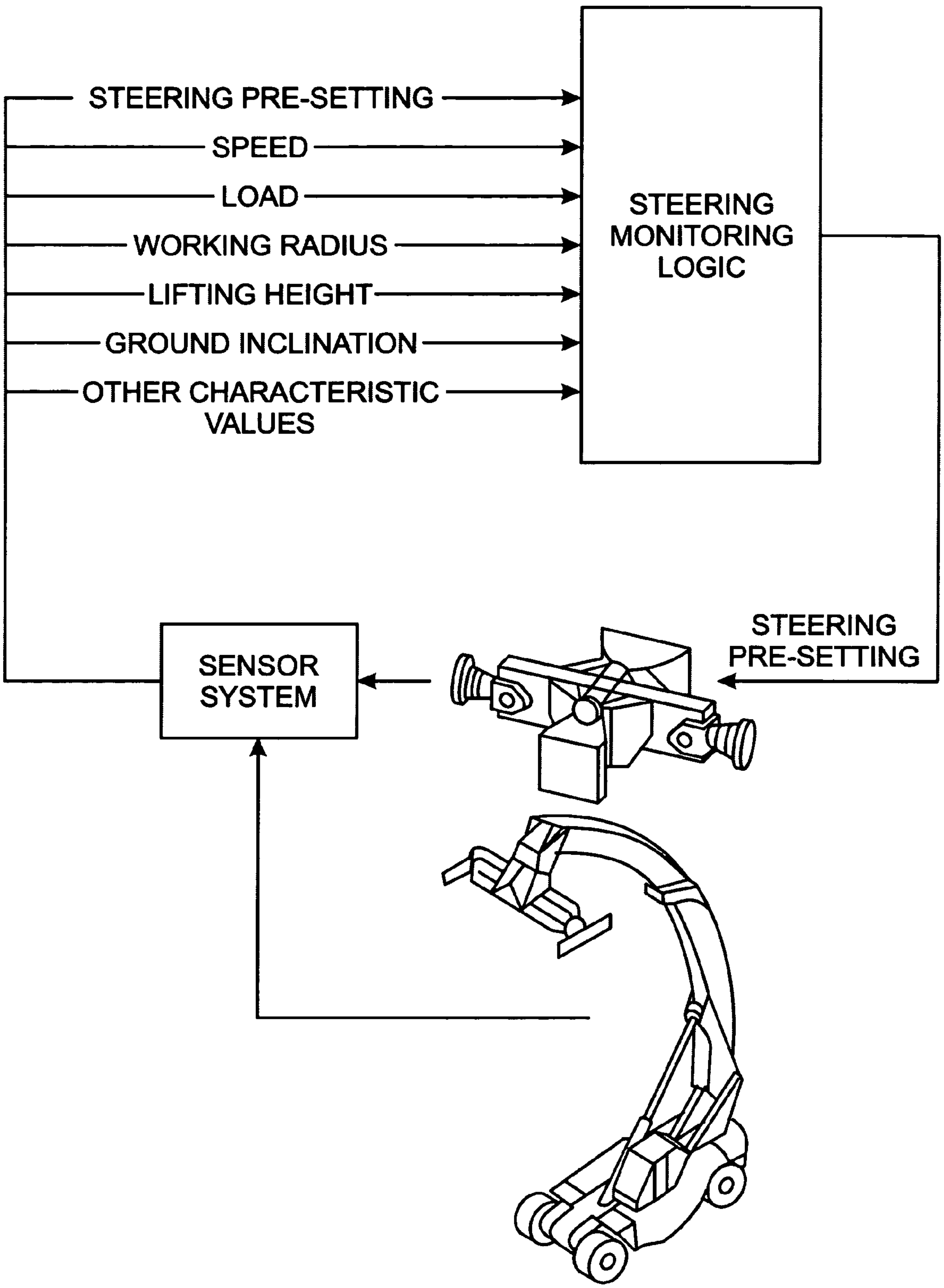
STEERING PRE-SETTING
SPEED
LOAD
WORKING RADIUS
LIFTING HEIGHT
GROUND INCLINATION
OTHER CHARACTERISTIC VALUES
STEERING MONITORING LOGIC
STEERING PRE-SETTING
SENSOR SYSTEM

LOADING UNIT AND/OR A LIFTING UNIT, IN PARTICULAR A REACH STACKER

CROSS-REFERENCE TO RELATED APPLICATION

This application claims priority to German Application Serial No. 102004021840.4 filed May 4, 2004, the entire disclosure of which is hereby incorporated by reference into the present application, as provided in MPEP § 201.13.

FIELD

The present application relates to a loading unit and/or lifting unit, in particular to a reach stacker.

BACKGROUND AND SUMMARY

A reach stacker is a loader which is suitable for the transferring of heavy loads such as containers, part loads and the like. The load handling with reach stackers does not take place via a lifting frame, but is rather carried out with the aid of a boom which is generally made as a telescopic boom. The present application is not restricted to reach stackers, but also includes other load units and/or lifting units such as stackers or other units which are suitable for load handling.

With such units usual today, the wheels are fully deflected on a maximum pre-setting of the steering angle.

Since the maximum steering movement, i.e. the total steering range, is also available at high speeds, depending on the combination of speed and steering movement, situations can arise in which the potential for the unit to overturn may be increased. For example, the standing stability, or standing safety, may be decreased. With units usual today, it is exclusively at the discretion of the driver which steering movement is to be selected to avoid a tilting of the unit or not to move into a critical driving situation.

It is the underlying object of the present application to further develop a loading unit and/or lifting unit, and in particular a reach stacker, such that critical driving situations can be recognized and reduced or avoided.

This object is satisfied by a loading or lifting unit, in particular a reach stacker with one or more pick-ups for the detection of at least one operating parameter influencing the standing safety or stability of the unit and a computing unit in communication with the pick-ups which has means by means of which a maximum permitted value of an operating parameter for the ensuring of the standing safety is determined in dependence on one or more of the operating parameters detected. The term “operating parameter” is to be understood widely and includes, for example, at least one of the driving speed or the steering movement, the lifting load, the load height, the inclination and the working radius of the loading unit and/or lifting unit, or combinations thereof.

The calculation unit in accordance with one embodiment has means or a logic by means of which a maximum permitted value of a parameter, for example the steering movement, is determined from the measured parameter(s). The maximum permitted value of a parameter is determined with respect to the fact that the standing safety of the unit remains ensured or improved.

It is, for example, feasible that it is determined in a driving situation at a specific speed in which range of the steering movement the standing safety is given. A maximum permitted steering movement is determined on this basis. It is furthermore feasible, for example, that in a driving situation with a specific steering movement, it is determined up to which speed range the standing safety is given, i.e. up to which value the speed can be increased.

It is advantageous if not only one operating parameter is taken into the calculation, but a plurality or all parameters which have an influence on the standing safety of the unit are considered. However, in one embodiment, only a single parameter may be used.

In one embodiment, the operating parameter whose maximum value is determined is the steering movement of the loading unit and/or lifting unit.

The calculation unit can be made such that it determines the maximum permitted value of a parameter, for example of the steering movement, on the basis of only one operating parameter or advantageously on the basis of a plurality of operating parameters or all operating parameters. A critical driving situation can be reliably avoided if all parameters which have an influence on the standing safety of the unit go into the calculation of the maximum permitted steering movement. Examples for such parameters are the driving speed, the lifting load, the working radius, the load height, the boom inclination and the ground gradient or the inclination of the unit, or combinations thereof. Other characteristic values or parameters can also be of importance and be included in the calculation. The calculation unit or the logic contained therein determines the maximum permitted value of a parameter or of the steering movement at which the standing safety is still ensured on the basis of a known dependence of the standing safety of the unit on the parameters which influence it.

In another aspect, a pick-up is provided for the detection of the actual steering movement. This transducer can be made in a redundant manner, if desired.

In a further aspect, comparison means are provided by means of which the actual steering movement is compared with the maximum permitted steering movement. The actual steering movement is determined by one or more pick-ups and compared with the permitted steering movement. The comparison means provided for this purpose can be a component of the calculating unit. The comparison result can be used, for example, to inform the operator that an exceeding of the maximum permitted steering movement is present. Such a signal can be reproduced acoustically or visually, for example.

Furthermore, an embodiment is feasible in which an exceeding of a maximum permitted parameter value is generally precluded.

In accordance with a further embodiment, means are provided by means of which—on the changing of an operating parameter, for example on an increase of the speed which would result in an exceeding of the maximum permitted value of a parameter, for example the steering angle—another operating parameter is changed such that the actual value does not exceed the maximum permitted value.

If, for example, the lifting height or the working radius is increased such that with otherwise unchanged further operating parameters and with an unchanged steering movement, an exceeding of the maximum permitted steering movement and thus a critical driving situation would result, in accordance with this embodiment another parameter, for example the driving speed, is changed—reduced in this example—so that an exceeding of the maximum permitted steering movement does not occur and the standing safety remains ensured.

If, for example, the steering movement is increased beyond the maximum permitted steering movement, provision can be made in accordance with this embodiment for another operating parameter, for example the working radius or the travel speed, to be changed, i.e. reduced, such that the permitted range of the steering movement covers the actual steering movement.

If, in a further example of this embodiment, the speed of e.g. the reach stacker is increased such that, with otherwise unchanged operating parameters and steering movement, a critical situation would arise, provision is made for another parameter, for example the working radius or the lifting height, to be reduced in the degree by which the speed is increased such that no exceeding of the maximum permitted steering movement occurs.

Which parameter is changed for the aforesaid purpose can be fixedly pre-set or be selectable.

Provision can be made in a further embodiment for means to be provided which have the effect that a change of an operating parameter is only possible to the extent in which the maximum permitted value of a parameter is not exceeded with otherwise unchanged operating parameters. In this case, a critical driving situation can also be avoided. A difference from the aforesaid embodiment results in that a compensation by another parameter does not take place.

Accordingly, means can be provided which have the effect that a change of an operating parameter is only possible to that extent in which, for example, the permitted range of the steering movement is not exceeded (without changing other parameters). In this case, for example, the lifting height or the working radius can only be changed to that extent—with otherwise unchanged operating parameters—that the actual steering movement remains in the permitted range.

If, in this embodiment, a reach stacker is, for example, accelerated, the other operating parameters are not changed and the speed increase is only possible to the extent that the standing safety of the reach stacker is still ensured, i.e. that the actual steering movement coincides with the permitted steering movement.

As stated above, means can be provided for the display of the maximum permitted steering movement and/or for the emission of a signal when the actual value, for example, the steering movement, exceeds the maximum permitted value.

Provision can be made in a further aspect for the calculation unit furthermore to have means by means of which an optimum steering speed or steering acceleration can be determined in dependence on one or more of the operating parameters detected. The operating parameters detected can be parameters which are used for the determination of the permitted range of a parameter. Means are preferably provided for the setting of the actual steering speed to the determined optimum steering speed. In this manner, the steering speed and the steering acceleration can be changed in accordance with the driving situation in order to ensure the standing safety of the unit. It is thus feasible that, for example, an increase of the driving speed does not only result in a reduction in the permitted range of the steering movement, but also in a reduction in the steering speed and steering acceleration.

In a further aspect, means are provided by means of which the maximum permitted steering movement is set at a maximum pre-setting of the steering angle. Accordingly, with a maximum pre-setting of the steering angle, the wheels are not necessarily moved fully, but only up to the maximum permitted steering movement.

Further details and advantages will be explained with reference to an embodiment shown in the drawing.

DESCRIPTION OF THE DRAWINGS

FIG. 1 shows a schematic representation of a reach stacker with steering monitoring.

DETAILED DESCRIPTION

Different parameters of the reach stacker, namely the current speed, load, working radius, lifting height and the parameter of the ground gradient, are detected by means of a sensor system. Other characteristic values of the reach stacker can also additionally be measured. A maximum possible steering movement (steering presetting) is determined in the steering monitor (logic) from the detected parameters which ensures a still sufficient standing safety.

The setting of the actual steering movement is only possible within the permitted range. One or more transducers (redundant design) are provided to determine the actual steering movement.

The steering speed and the steering acceleration are adapted accordingly by the restriction of the possible range of the steering movement to a permitted range, i.e. on a reduction of the permitted range of the steering movement, e.g. on an increase of the driving speed of the reach stacker, the steering speed and the steering acceleration are reduced. It is thus achieved that the steering movement and the steering speed do not become too large at high speeds.

The maximum pre-setting of the steering angle by the operator results in a setting of the actual steering movement to the maximum permitted steering movement.

The invention claimed is:

1. A loading or lifting unit, comprising:

one or more pick-ups for detecting an actual steering movement and at least one operating parameter influencing a standing safety of the loading or lifting unit; and a calculating unit in communication with the one or more pick-ups, configured to determine a maximum permitted value of the steering movement in dependence on the at least one operating parameter detected, and further configured to preclude the steering movement from exceeding the maximum permitted value to improve the standing safety.

2. A loading or lifting unit in accordance with claim 1, wherein comparison means are provided for comparing the actual steering movement to the maximum permitted value of the steering movement.

3. A loading or lifting unit in accordance with claim 1, wherein means are provided to change an operating parameter other than the steering movement to preclude the steering movement from exceeding the maximum permitted value of the steering movement.

4. A loading or lifting unit in accordance with claim 1, wherein means are provided so that changing the steering movement is only possible to an extent that the maximum permitted value of the steering movement is not exceeded when no other operating parameter of the at least one operating parameter is changed.

5. A loading or lifting unit in accordance with claim 1, wherein means are provided for displaying the maximum permitted value of the steering movement, or for emitting a signals, when the steering movement exceeds the maximum permitted value of the steering movement.

6. A loading or lifting unit in accordance with claim 1, wherein the at least one operating parameter detected includes at least one of a driving speed, a lifting load, a working radius, a load height, a boom inclination, and an inclination of the loading or lifting unit.

7. A loading lifting unit in accordance with claim 1, wherein the calculation unit is further configured to determine an optimum steering speed in dependence on the at least one operating parameter detected.

8. A loading or lifting unit in accordance with claim 1, wherein means are provided for setting a maximum permitted steering movement on a maximum pre-setting of a steering angle.

9. A loading or lifting unit in accordance with claim 1, wherein the at least one operating parameter detected includes each of a driving speed, a lifting load, a working radius, a load height, a steering movement, a boom inclination, and an inclination of the loading or lifting unit.

10. A loading or lifting unit controlled by an operator, comprising:

one or more pick-ups configured to detect an actual steering movement and at least one operating parameter influencing a standing stability of the loading or lifting unit; and an electronic controller configured to determine a maximum permitted value of the steering movement, and to automatically adjust the steering movement to preclude the steering movement from exceeding the maximum permitted value, and in dependence on the at least one operating parameter detected, to improve the standing stability of the loading or lifting unit.

11. The loading or lifting unit of claim 10, wherein the electronic controller is further configured to limit a steering amount.

12. The loading or lifting unit of claim 10, wherein the electronic controller is further configured to limit a speed of the loading or lifting unit.

13. A method for operating a loading or lifting unit controlled by an operator, the method comprising:

measuring an actual steering movement and at least one operating parameter influencing a standing stability of the loading or lifting unit via one or more pick-ups;

receiving in an electronic controller the at least one operating parameter measure;

determining a maximum permitted value of the steering movement;

precluding the steering movement from exceeding the maximum permitted value; and adjusting at least one operating parameter other than the steering movement in dependence on the at least one operating parameter received so that the maximum permitted value of the steering movement is not exceeded.

14. The method of claim 13 wherein said measuring comprises using redundant sensors to measure an operating parameter of the loading or lifting unit.

15. The method of claim 13 wherein said precluding comprises reducing a steering of the loading or lifting unit via the electronic controller.

16. The method of claim 13 wherein said adjusting comprises reducing a speed of the loading or lifting unit via the electronic controller.

17. The method of claim 13 wherein said adjusting comprises reducing a lifting height of the loading or lifting unit via the electronic controller.

18. The method of claim 13 wherein said adjusting comprises reducing a working radius of the loading or lifting unit via the electronic controller.

19. The method of claim 13 wherein the loading or lifting unit is a reach stacker.

20. The method of claim 13, wherein the at least one operating parameter received includes a driving speed, a lifting load, a working radius, a load height, a steering movement, a boom inclination, or an inclination of the loading or lifting unit.

21. The method of claim 13, wherein the at least one operating parameter received includes each of a driving speed, a lifting load, a working radius, a load height, a steering movement, a boom inclination, and an inclination of the loading or lifting unit.

22. A loading or lifting unit, comprising:

one or more pick-ups for of detecting an actual steering movement and at least one operating parameter influencing a standing safety of the loading or lifting unit; and a calculating unit in communication with the one or more pick-ups and configured to determine a maximum permitted value of the steering movement in dependence on the at least one operating parameter detected, and further configured to preclude the steering movement from exceeding the maximum permitted value to improve the standing safety;

wherein means are provided to change an operating parameter other than the steering movement to preclude the steering movement from exceeding the maximum permitted value of the steering movement; and wherein the operating parameter other than the steering movement includes lifting load, a working radius, a load height, a boom inclination, or an inclination of the loading or lifting unit.

23. A loading or lifting unit, comprising:

one or more pick-ups for detecting an actual steering movement and at least one operating parameter influencing a standing safety of the loading or lifting unit; and a calculating unit in communication with the one or more pick-ups, configured to determine a maximum permitted value of the steering movement in dependence on the at least one operating parameter detected, and further configured to preclude the steering movement from exceeding the maximum permitted value to improve the standing safety;

wherein changing the steering movement is only possible to an extent that the maximum permitted value of the steering movement is not exceeded when none of a lifting load, a working radius, a load height, a boom inclination, and an inclination of the loading or lifting unit are changed.

* * * * *